US011169281B2

(12) United States Patent
Ko et al.

(10) Patent No.: US 11,169,281 B2
(45) Date of Patent: Nov. 9, 2021

(54) RADON SENSOR DEVICE USING POLYHEDRAL-SHAPED IONIZATION CHAMBER

(71) Applicant: FTLAB CO., LTD., Ansan-si (KR)

(72) Inventors: Jae Jun Ko, Seoul (KR); Young Gweon Kim, Anyang-si (KR)

(73) Assignee: FTLAB CO., LTD., Ansan-si (KR)

( * ) Notice: Subject to any disclaimer, the term of this patent is extended or adjusted under 35 U.S.C. 154(b) by 0 days.

(21) Appl. No.: 16/972,577

(22) PCT Filed: Jan. 17, 2020

(86) PCT No.: PCT/KR2020/000837
§ 371 (c)(1),
(2) Date: Dec. 4, 2020

(87) PCT Pub. No.: WO2020/218714
PCT Pub. Date: Oct. 29, 2020

(65) Prior Publication Data
US 2021/0247527 A1    Aug. 12, 2021

(30) Foreign Application Priority Data
Apr. 24, 2019    (KR) .......................... 10-2019-0047674

(51) Int. Cl.
*G01T 1/185* (2006.01)
*G01T 1/178* (2006.01)
*G01T 7/00* (2006.01)

(52) U.S. Cl.
CPC .................... *G01T 1/185* (2013.01)

(58) Field of Classification Search
CPC ............ G01T 1/185; G01T 1/178; G01T 7/00
See application file for complete search history.

(56) References Cited

U.S. PATENT DOCUMENTS 2,842,674 A * 7/1958 Barstad .................. G01T 1/185
250/378
4,755,682 A * 7/1988 Burgess ................. G01T 1/185
250/374
(Continued)

FOREIGN PATENT DOCUMENTS

JP          2015-156463 A    6/2005
KR    10-2015-0093987 A    8/2015
(Continued)

OTHER PUBLICATIONS

International Search Report and Written Opinion for International application No. PCT/KR2020/000837, dated Apr. 24, 2020, ISA/KR.

*Primary Examiner* — David P Porta
*Assistant Examiner* — Fani Boosalis
(74) *Attorney, Agent, or Firm* — Lucas & Mercanti, LLP

(57) ABSTRACT

A radon sensor device using a polyhedral-shaped ionization chamber is proposed. The radon sensor device includes: an ionization chamber having an open side and inner sides surrounded by a first conductor and generating an electrical field therein by applying bias power to the first conductor; a cover having a first side covered with a second conductor and closing the open side of the ionization chamber such that that first conductor disposed on the inner sides of the ionization chamber and the second conductor are electrically connected; a probe unit disposed in the ionization chamber and absorbing ion charges produced when alpha (α) decay occurs in the ionization chamber; and a measurement circuit detecting an alpha particle detection signal by amplifying and processing an electrical micro-signal input from the probe unit into a predetermined magnitude.

19 Claims, 8 Drawing Sheets

(56) References Cited

U.S. PATENT DOCUMENTS 7,791,037 B1 * 9/2010 Wedding ................. G01T 1/185
250/374
2020/0278457 A1 * 9/2020 Kwon ..................... G01T 1/178

FOREIGN PATENT DOCUMENTS

| KR | 20150093987 A * | 8/2015 |
|---|---|---|
| KR | 10-2017-0023599 A | 3/2017 |
| KR | 101730887 B1 | 4/2017 |
| KR | 101730891 B1 | 4/2017 |
| KR | 10-2018-0129480 A | 12/2018 |
| KR | 10-1935880 B1 | 1/2019 |

* cited by examiner

[FIG. 1]
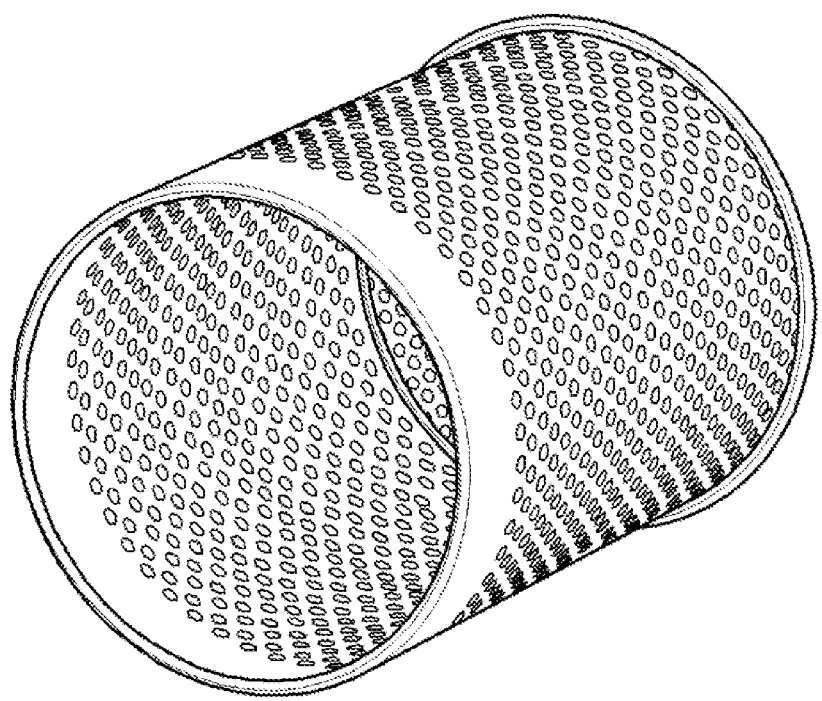

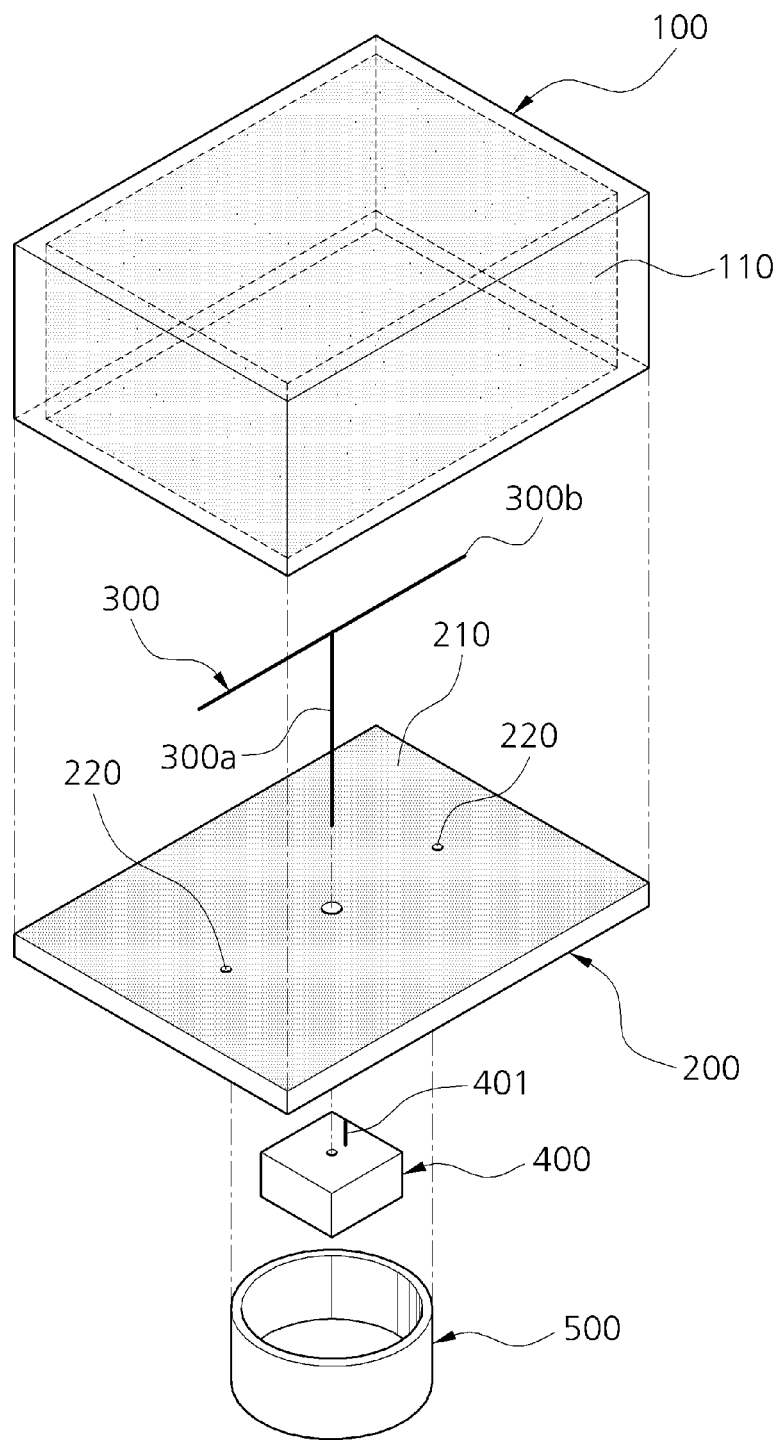
[FIG. 2]

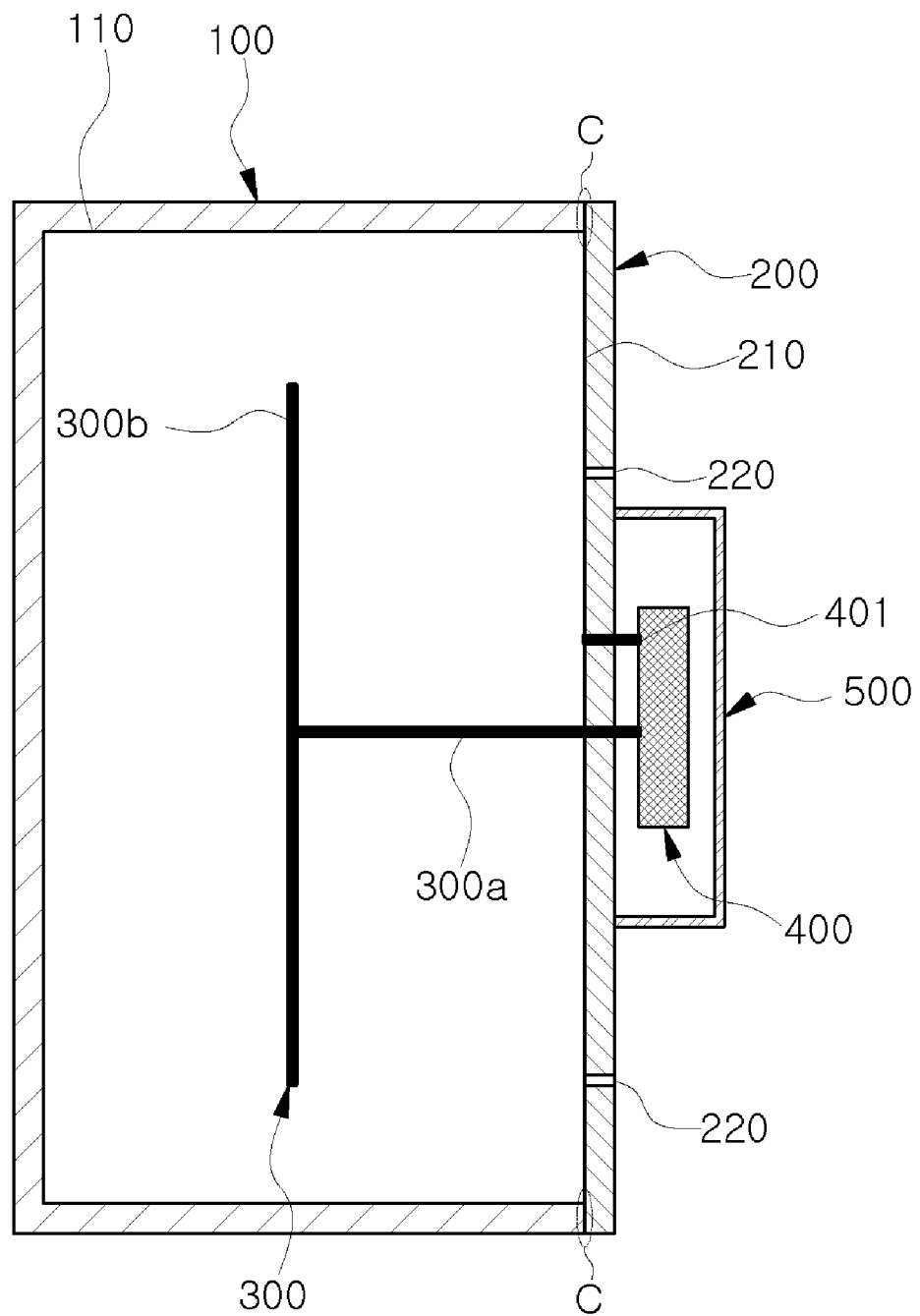
[FIG. 3]

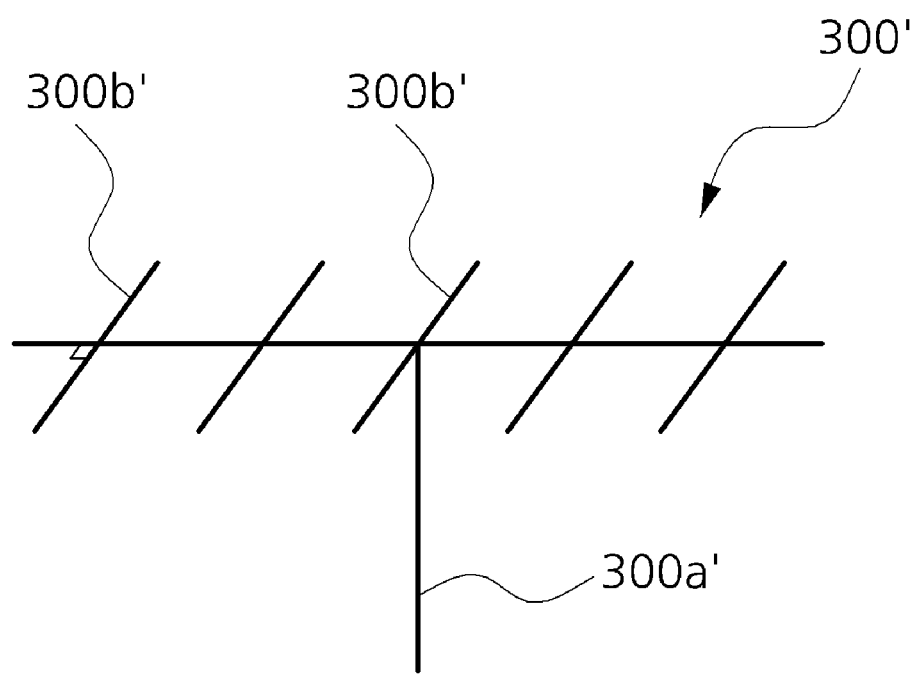

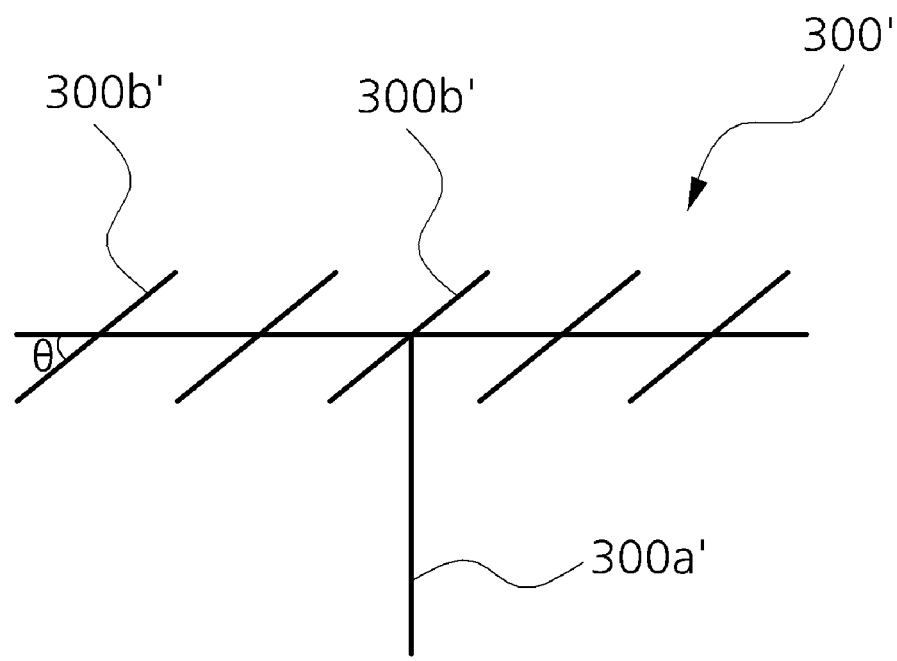
[FIG. 4B]

[FIG. 4C]
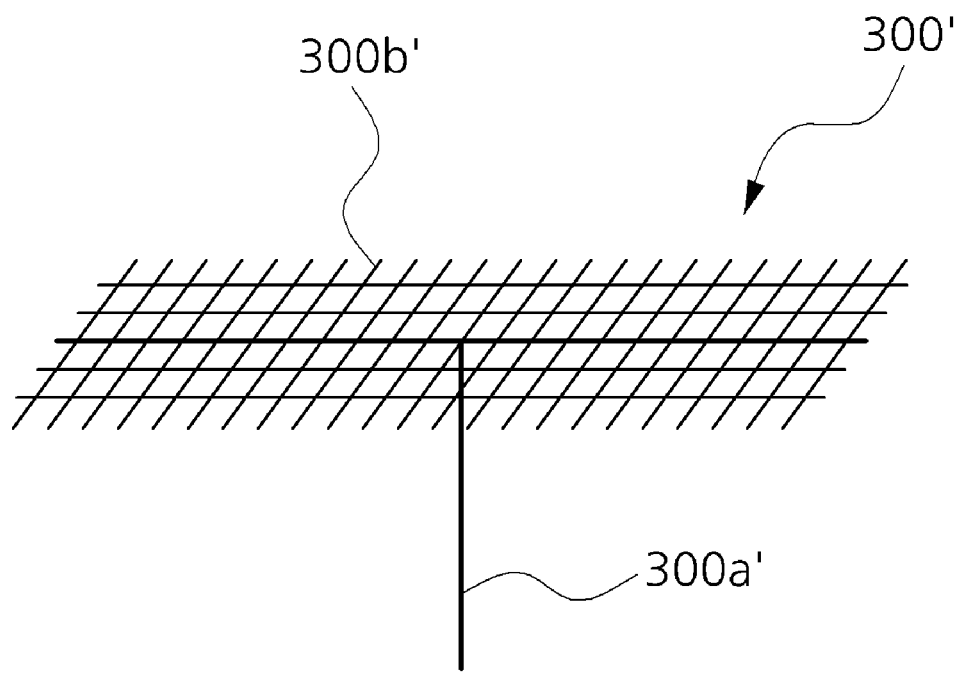

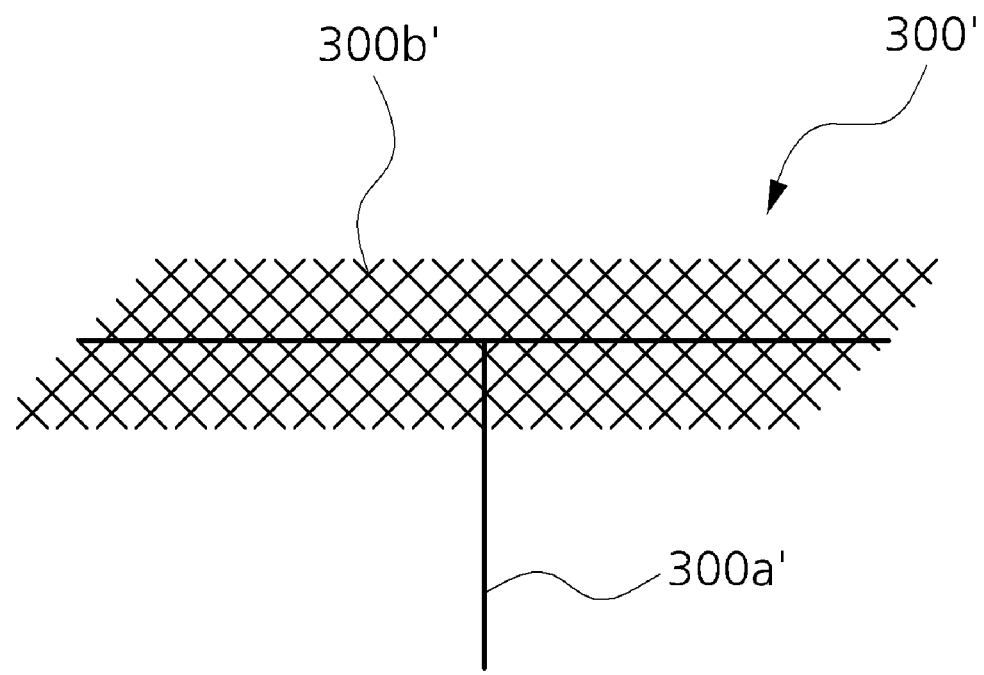

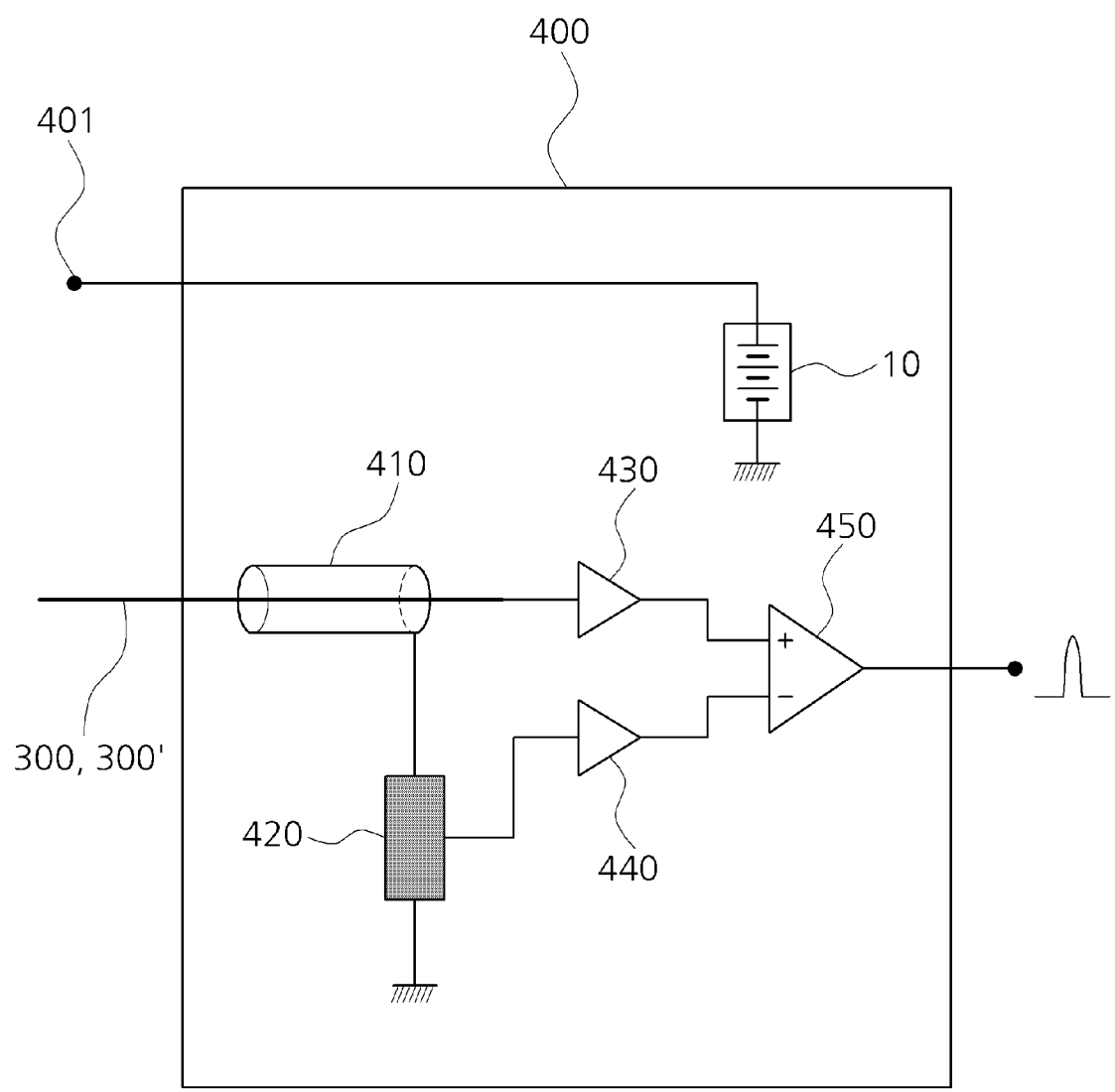
[FIG. 5]

RADON SENSOR DEVICE USING POLYHEDRAL-SHAPED IONIZATION CHAMBER

CROSS-REFERENCE TO RELATED APPLICATION

This application is a 371 U.S. national stage of PCT/KR2020/000837, filed Jan. 17, 2020, which claims the benefit of Korean Patent Application No. 10-2019-0047674 filed Apr. 24, 2019 and the contents of each of which are incorporated herein by reference.

TECHNICAL FIELD

The present disclosure relates to a radon sensor using an ionization chamber and, more particularly, to a radon sensor device using a polyhedral-shaped ionization chamber.

BACKGROUND ART

In general, an ionization chamber that is used for a radon sensor, as shown in FIG. 1, has a cylindrical structure in which a conductive cylinder having a plurality of pores and a straight probe unit disposed in the central axis in the cylinder are combined.

Such a cylindrical structure of the related art has the advantage that an electrical field intensifies toward the probe unit from the inner surface of the ionization chamber and is uniformly distributed in the axial direction, so the measurement efficiency is high. However, the cylindrical structure is difficult to mount and is vulnerable to electromagnetic wave noise due to the pores.

Further, there is inconvenience in that it is required to attach an appropriate filter to prevent dust from permeating through the pores. Further, since high-voltage bias is applied to the ionization chamber having a cylindrical structure and is completely exposed to the outside, there is also a possibility of leakage of electricity and an electric shock.

Further, air excessively smoothly flows inside due to the pores and thoron (Rn-220) having a short half-life of 55.6 seconds also flows into the ionization chamber, so there is a problem that there is a possibility of simultaneous measurement of radon (Rn-222) and thoron (Rn-220).

DISCLOSURE

Technical Problem

The present disclosure has been made in an effort to solve the problems described above and an objective of the present disclosure is to provide a radon sensor device using a polyhedral-shaped ionization chamber that has excellent mountability and mass productivity, resists well electromagnetic noise, has not possibility of leakage of electricity, has high measurement efficiency, and can exclude interference by thoron (Rn-220) instead of the cylindrical structure of the related art.

Technical Solution

In order to achieve the objectives, an aspect of the present disclosure provides a radon sensor device using a polyhedral-shaped ionization chamber. The radon sensor device includes: an ionization chamber having an open side and inner sides surrounded by a first conductor and generating an electrical field therein by applying bias power to the first conductor; a cover having a first side covered with a second conductor and closing the open side of the ionization chamber such that that first conductor disposed on the inner sides of the ionization chamber and the second conductor are electrically connected; a probe unit disposed in the ionization chamber and absorbing ion charges produced when alpha (α) decay occurs in the ionization chamber; and a measurement circuit detecting an alpha particle detection signal by amplifying and processing an electrical microsignal input from the probe unit into a predetermined magnitude.

The ionization chamber may be formed in a hexahedral shape using an insulating material.

The first conductor disposed on the inner sides of the ionization chamber may be formed by coating conductive paint with a predetermined thickness on the inner sides of the ionization chamber.

The bias power that is applied to the first conductor disposed on the inner sides of the ionization chamber is a DC voltage of 50V to 300V.

The first conductor disposed on the inner sides of the ionization chamber and the second conductor disposed on the first side of the cover may be electrically connected through joints between the cover and the ionization chamber.

The cover may be a printed circuit board (PCB) having a predetermined thickness and the entire of a first side of the printed circuit board may be covered with the second conductor.

A plurality of holes may be formed through the cover so that external air can flow into the ionization chamber or air can flow outside.

When a volume of the ionization chamber is 100 cc, a diameter of the holes formed through the cover may be 0.2 mm to 0.3 mm and the number thereof may be 6 to 10.

The probe may detect ion charges produced by a collision of air and alpha particles produced when alpha (α) decay occurs in the ionization chamber.

The probe unit may be disposed at a center in the ionization chamber and may be formed in a T-shape.

The probe unit is formed in a T-shape by perpendicularly combining first and second probes that have a rod shape or a straight shape having a predetermined length; and a first end of the first probe may be electrically connected with the measurement circuit through the cover and a second end of the first probe may be disposed at the center in the ionization chamber, and a center of the second probe may be perpendicularly coupled to the second end of the first probe and may be disposed at the center in the ionization chamber such that distances between the inner sides of the ionization chamber and a surrounding portion of the second probe are the same.

The probe unit may be disposed at a center in the ionization chamber and may be formed in an outdoor TV antenna shape.

The probe unit may be formed by combining a first probe having a T-shape and second probes having a predetermined pattern, in which the first probe may have an upper head formed in a rod shape or a straight shape with a predetermined length and disposed at the center in the ionization chamber, may have a lower leg formed in a rod shape or a straight shape with a predetermined length and having a first end perpendicularly connected to a center of the upper head to form a T-shape and a second end electrically connected to the measurement circuit through the cover; and the second probes may be formed in a rod shape or a straight shape with a predetermined length, may be coupled at centers to the upper head of the first probe, may be longitudinally spaced a predetermined distance from each other, and may be coupled perpendicular to or at a predetermined angle with respect to a longitudinal direction of the upper head of the first probe to have a predetermined pattern.

The probe unit may be formed by combining a first probe having a T-shape and second probes having a predetermined pattern, in which the first probe may have an upper head formed in a rod shape or a straight shape with a predetermined length and disposed at the center in the ionization chamber, may have a lower leg formed in a rod shape or a straight shape with a predetermined length and having a first end perpendicularly connected to a center of the upper head to form a T-shape and a second end electrically connected to the measurement circuit through the cover; and the second probes may be combined to vertically and horizontally cross each other at a right angle in a lattice pattern and centers thereof may be longitudinally coupled to the upper head of the first probe.

The second probes may be coupled to the upper head of the first probe to vertically and horizontally cross each other at a right angle, whereby the lattice pattern thereof may be a square lattice pattern or a skew-crossed pattern.

The probe unit may be disposed in the ionization chamber such that distances between the inner sides of the ionization chamber and a surrounding portion of the second probe are the same.

The measurement circuit may be disposed on a second side of the cover and may be mounted to be electrically connected with the second conductor disposed on the first side of the cover through a bias voltage outputter for outputting the bias power.

The measurement circuit may include: a guard ring installed such that the probe unit is disposed therethrough and absorbing and sensing a leakage current generated between the ionization chamber and the probe unit to a ground; a noise detector connected between the guard ring and the ground, sends a DC-type leakage current generated between the ionization chamber and the probe to the ground, and detects and outputs AC-type noise; first and second pre-amplifiers respectively connected to another end of the probe and an output end of the noise detector, and amplifying small electrical signals input from the probe and the noise detector into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

The noise detector may be configured by electrically connecting at least any one element of a resistance, a condenser, and a diode in series, in parallel, or in combination of series and parallel.

The radon sensor device may further include an electromagnetic wave-protective cap installed on a second side of the cover to surround the entire measurement circuit and is made of a conductive material to prevent signal disturbance of the measurement circuit due to external electromagnetic wave noise.

The electromagnetic wave-protective cap may be installed to be electrically connected with a ground of the measurement circuit.

Advantageous Effects

As described above, according to the radon sensor device using a polyhedral-shaped ionization chamber, it is possible to provide a radon sensor that has excellent mountability, resists well electromagnetic wave noise, is simply assembled with a low cost, and is suitable for mass production by using a polyhedral-shaped ionization chamber that has excellent mountability and mass productivity, resists well electromagnetic wave noise, has high measurement efficiency without a possibility of an electric shock or leakage of electricity, and can exclude interference of thoron (Rn-220) instead of an ionization chamber having a cylindrical shape of the related art.

DESCRIPTION OF DRAWINGS

FIG. 1 is a perspective view showing an ionization chamber having a cylindrical structure that is applied to the related art;

FIG. 2 is an assembled perspective view showing a radon sensor device using a polyhedral-shaped ionization chamber according to an embodiment of the present disclosure;

FIG. 3 is an assembled cross-sectional view showing the radon sensor device using a polyhedral-shaped ionization chamber according to an embodiment of the present disclosure;

FIGS. 4A to 4D are perspective view showing a probe unit applied to another embodiment of the present disclosure; and FIG. 5 is a detailed block diagram showing a measurement circuit applied to an embodiment of the present disclosure.

BEST MODE

The objectives, characteristics, and advantages will be described in detail below with reference to the accompanying drawings, so those skilled in the art may easily achieve the spirit of the present disclosure. In describing the present disclosure, detailed descriptions of well-known technologies will be omitted so as not to obscure the description of the present disclosure with unnecessary details.

Terms including ordinal numbers such as 'first', 'second', etc., may be used to describe various components, but the components are not to be construed as being limited to the terms. The terms are used only to distinguish one component from another component. For example, the 'first' component may be named the 'second' component, and vice versa, without departing from the scope of the present disclosure. Terms used in the present specification are used only to describe specific exemplary embodiments rather than limiting the present disclosure. Singular forms are intended to include plural forms unless the context clearly indicates otherwise.

Terminologies used herein were selected as terminologies that are currently used as generally as possible in consideration of the functions herein, but may be changed, depending on the intention of those skilled in the art, precedents, or advent of a new technology. Further, there are terminologies selected by applicant(s) at the applicant(s)' opinion in specific cases, and in these cases, the meanings will be described in the corresponding parts. Accordingly, the terminologies used herein should be defined on the basis of the meanings of the terminologies and the entire specification, not simply the names of the terminologies.

Throughout the present specification, unless explicitly described otherwise, "comprising" any components will be understood to imply the inclusion of other components rather than the exclusion of any other components. Further, the terms "~part", "module", and the like mean a unit for processing at least one function or operation and may be implemented by hardware or software or by a combination of hardware and software.

Hereinafter, embodiments of the present disclosure will be described in detail with reference to the accompanying drawings. However, the embodiments of the present disclosure that will be described hereafter may be modified in various ways and the scope of the present disclosure is not limited to the embodiments that will be described in detail below. Embodiments of the present disclosure are provided to more completely describe the present disclosure to those skilled in the art.

FIG. 2 is an assembled perspective view showing a radon sensor device using a polyhedral-shaped ionization chamber according to an embodiment of the present disclosure, FIG. 3 is an assembled cross-sectional view showing the radon sensor device using a polyhedral-shaped ionization chamber according to an embodiment of the present disclosure, FIGS. 4a to 4d are perspective views showing a probe unit applied to another embodiment of the present disclosure, and FIG. 5 is a detailed block diagram showing a measurement circuit applied to an embodiment of the present disclosure.

Referring to FIGS. 2 to 5, a radon sensor device using a polyhedral-shaped ionization chamber according to an embodiment of the present disclosure, in a broad meaning, includes an ionization chamber 100, cover 200, a support 300, a measurement circuit 400, etc. The polyhedral-shaped ionization chamber according to an embodiment of the present disclosure may further include an electromagnetic wave-protective cap 500, etc. The components shown in FIGS. 2 to 5 are not necessary, so the radon sensor device using a polyhedral-shaped ionization chamber according to an embodiment of the present disclosure may include more components or fewer components.

Hereafter, the components of the radon sensor device using a polyhedral-shaped ionization chamber according to an embodiment of the present disclosure are described in detail.

The ionization chamber 100 has a polyhedral shape having an open side and inner sides surrounded by a first conductor 110 made of a conductive material, and generates an electrical field therein by applying bias power 10 to the first conductor 110.

It is preferable that the ionization chamber 100 is formed entirely in a hexahedral shape (e.g., a regular hexahedron or a rectangular parallelepiped) using an insulating material such as plastic, but is not limited thereto and may be a solid figure surrounded with four or more flat polygons such as a tetrahedron, a pentahedron, a heptahedron, and an octahedron.

Further, it is preferable that the first conductor 110 disposed on the inner sides of the ionization chamber 100 may be formed by coating conductive paint to have a predetermined thickness on the inner sides of the ionization chamber 100.

Further, it is preferable that the bias power 10 that is applied to the first conductor 110 disposed on the inner sides of the ionization chamber 100 may be a DC voltage of about 50V to 300V.

An electrical field is generated between the probe unit 300 in the ionization chamber 100, the first conductor 110 disposed on the inner sides of the ionization chamber 100, and a second conductor 210 disposed on a side of the cover 200 by applying high-voltage bias power 10 to the first conductor 110 disposed on the inner sides of the ionization chamber 100 and the second conductor 210 disposed on a side of the cover 200 to be described below, whereby it is possible to absorb an ion current generated by alpha ($\alpha$) decay through the probe unit 300. The ionization chamber 100 has a simple configuration, can be implemented at a low cost, and can perform 3-dimensional measurement.

Further, a stable DC voltage of about 50V to 300V (more preferably, about 50V to 150V) is used for the high-voltage bias power 10 that is applied to the first conductor 110 disposed on the inner sides of the ionization chamber 100 and the second conductor 210 disposed on a side of the cover 200, thereby obtaining a condition in which additional ion charges can be effectively produced when alpha decay occurs in the ionization chamber 100. The power supplied from the high-voltage bias power 10 (e.g., a voltage or a current) may be changed in various ways, depending on the measurement range, the sensitivity, etc.

The cover 200 closes the open side of the ionization chamber 100, has a side covered with the second conductor 210 made of a conductive material, and electrically connects the first conductor 110 disposed on the inner sides of the ionization chamber 100 and the second conductor 210, and is coupled such that the side on which the second conductor 210 is disposed and the open side of the ionization chamber 100 face each other, thereby closing the open side of the ionization chamber 100.

In this configuration, it is preferable that the first conductor 110 disposed on the inner sides of the ionization chamber 100 and the second conductor 210 disposed on a side of the cover 200 are electrically connected through the joints C between the cover 200 and the ionization chamber 100.

The cover 200 may be a common printed circuit board (PCB) having a predetermined thickness and one entire side of the printed circuit board (PCB) may be covered with the second conductor 210.

Further, a plurality of holes 220 may be formed through the cover 200 so that external air can flow into the ionization chamber 100 or air can flow outside.

The diameter and the number of the holes 220 formed through the cover 200 may depend on the volume of the ionization chamber 100.

For example, when the volume of the ionization chamber is 100 cc, it is preferable that the diameter is about 0.2 mm to 0.3 mm and the number is about 6 or 10.

In this case, since a diffusion time for external air to flow into the ionization chamber 100 is about 5 minutes to 10 minutes, the half-life of thoron (Rn-220) which is about 55.6 seconds is repeated about 5 times or more, so the concentration decreases to $\frac{1}{2}^5$ or less. Accordingly, interference by thoron (Rn-220) is excluded.

Further, since the holes 220 are small and large dust cannot flow inside, there is no need for a separate dust filter. Further, the open space of the ionization chamber 100 is minimized and the possibility to cause a measurement error due to permeation of electromagnetic wave noise is remarkably decreased in comparison to the ionization chamber having a cylindrical structure with several pores shown in FIG. 1.

Meanwhile, when the cover 200 is a printed circuit board (PCB), it is preferable that the holes 220 are pinholes of small defects or small holes formed through a film such as a metallic deposited film or an insulating film.

The probe unit 300 is made of a conductive material to be able to absorb ion charges produced when alpha decay occurs due to a radon (Rn-222) nuclide, etc. in the ionization chamber, is disposed in the ionization chamber 100, and absorbs ion charges produced when alpha ($\alpha$) decay occurs in the ionization chamber 100.

That is, the probe unit 300 may be provided to detect ion charges produced by a collision of air and alpha particles produced when alpha (α) decay occurs in the ionization chamber 100.

It is preferable that the probe unit 300 is provided to detect alpha particles produced when alpha decay occurs due to radon (Rn-222) gas from the air flowing in the ionization chamber 100, but it is not limited thereto and may be provided to detect all radioactive gases discharged as alpha (α) particles.

Further, the probe unit 300 is formed in a T-shape, as shown in FIGS. 2 and 3 as an embodiment, so it is preferable that the probe unit 300 is disposed at the center in the ionization chamber 100.

That is, the probe unit 300 is formed in a T-shape by perpendicularly combine a first probe 300a and a second probe 300b that is formed in a rod shape or a straight shape with a predetermined length. A first end of the first probe 300a is electrically connected to the measurement circuit 400 through the cover 200 and a second end is disposed at the center in the ionization chamber 100.

Further, the center of the second probe 300b is perpendicularly coupled to the second end of the first probe 300a and is disposed at the center in the ionization chamber 100 such that the distances between the inner sides of the ionization chamber 100 and the surrounding portion of the second probe 300b are the same.

Further, the probe unit 300', as shown in FIGS. 4a to 4d as other embodiments, may be formed in the shape of a common outdoor TV antenna and is preferably disposed at the center in the ionization chamber 100.

That is, as shown in FIGS. 4a and 4b, the probe unit 300' is formed by combining a T-shaped first probe 300a' and second probes 300b' having a predetermined pattern, and the first probe 300a' may be formed in the same shape as the probe unit 300 described above. That is, the first probe 300a' has an upper head formed in a rod shape or a straight shape with a predetermined length and disposed at the center in the ionization chamber 100, has a lower leg formed in a rod shape or a straight shape with a predetermined length and having a first end perpendicularly connected to the center of the upper head to form a T-shape and a second end electrically connected to the measurement circuit 400 through the cover 200.

Further, the second probes 300b' are formed in a rod shape or a straight shape with a predetermined length, are coupled at the centers to the upper head of the first probe 300a', and are longitudinally spaced a predetermined distance from each other. Further, the second probes 300b' may be coupled perpendicular to (see FIG. 4a) or at a predetermined angle θ (preferably, about 1 to 90 degrees) (FIG. 4b) with respect to the longitudinal direction of the upper head of the first probe 300a' in the same plane as the upper head of the first probe 300a', thereby having a predetermined pattern.

Further, as shown in FIGS. 4c and 4d, the probe unit 300' is formed by combining a T-shaped first probe 300a' and second probes 300b' having a predetermined pattern. The upper head of the first probe 300a' is formed in a rod shape or a straight shape with a predetermined length and is disposed at the center in the ionization chamber 100. The lower leg of the first probe 300a' is formed in a rod shape or a straight shape with a predetermined length and has a first end perpendicularly coupled to the center of the upper head and a second end electrically connected to the measurement circuit 400 through the cover 200.

Further, the second probes 300b' are combined to vertically and horizontally cross each other at a right angle in a lattice pattern and the centers thereof may be longitudinally coupled to the upper head of the first probe 300a'.

Further, the second probes 300b', as shown in FIG. 4c, are coupled to the upper head of the first probe 300a' to vertically and horizontally cross each other at a right angle in the same plane as the upper head of the first probe 300a', whereby the lattice pattern thereof may be a square lattice pattern. Further, as shown in FIG. 4d, the lattice pattern may be a skew-crossed pattern. Further, though not shown in the figures, for example, the lattice pattern may be formed in various shapes such as a rectangular lattice pattern, a square lattice pattern, or a changed lattice pattern.

That is, it is advantageous that the probe unit 300 or 300' is a T-shape or an outdoor TV antenna shape rather than a straight probe that is generally used in the ionization chamber having a cylindrical shape shown in FIG. 1 described above. The reason is because when a straight shape is applied to a polyhedral ionization chamber 100, the distance between the inner sides and the probe 300 or 300' is large and is not uniform, so it is difficult to maintain an intense electrical field in the ionization chamber 100.

Accordingly, the probe unit 300 or 300' should be designed such that the distance between the inner sides of the ionization chamber 100 and the probe unit 300 or 300' is maintained as small as possible and an intense electrical field can be generated around the probe unit 300 or 300'. When the probe unit 300 or 300' having a T-shape or an outdoor TV antenna shape proposed in embodiments of the present disclosure are designed, the distance from the inner sides of the ionization chamber 100 is small and the intensity of the electrical field around the probe unit 300 or 300' is also increased, whereby absorption efficiency when ion charges are produced is increased and accordingly the measurement efficiency can be increased.

That is, the probe unit 300 or 300' is designed to be disposed in the ionization chamber 100 such that the distances between the inner sides of the ionization chamber 100 and the surrounding portion of the probes are the same, whereby the distances between the surrounding portion of the probe unit 300 or 300' and the inner sides of the ionization chamber 100 are uniform and small and the intensity of the electrical field around the probe unit 300 or 300' is also increased. Accordingly, it is possible to effectively increase the measurement efficiency by increasing the absorption efficiency when ion charges are produced.

The probe unit 300 or 300' configured in this way is electrically connected to the measurement circuit 400 through the cover 200.

Further, the measurement circuit 400 outputs an alpha particle detection signal by amplifying and processing an electrical micro-signal input from the probe unit 300 or 300' into a predetermined magnitude.

It is preferable that the measurement circuit 400 is disposed on a second side of the cover 200 and is mounted to be electrically connected with the second conductor 210 disposed on a first side of the cover 200 through a bias voltage outputter 401 for outputting bias power 10.

Further, the measurement circuit 400, as shown in FIG. 5, in a broad meaning, may include a guard ring 410, a noise detector 420, a first pre-amplifier 430, a second pre-amplifier 440, and/or a differential amplifier 450.

The guard ring 410 is made of a conductive material in a cylindrical shape, has the probe unit 300 or 300' disposed therethrough, and absorbs and sends a leakage current generated between the ionization chamber 100 and the probe unit 300 or 300' to a ground.

If the guard ring 410 is not provided, a current signal obtained from the probe unit 300 or 300' and a leakage current signal are combined, which causes the problem that the signal-to-noise ratio (SNR) decreases.

The noise detector 420 is connected between the guard ring 410 and the ground and maintains the potential of the guard ring 410 a little bit higher than the ground, thereby sending a DC-type leakage current generated between the ionization chamber 100 and the probe unit 300 or 300' to the ground and detecting and outputting an AC-type noise to the second pre-amplifier 440 to be described below.

It is preferable to configure the noise detector 420, for example, by electrically connecting at least any one element of a resistance, a condenser, and a diode in series, in parallel, and/or in combination of series and parallel.

The first pre-amplifier 430 is connected to a second end of the probe unit 300 or 300' and amplifies an electrical micro-signal input from the probe unit 300 or 300' into a predetermined magnitude.

The second pre-amplifier 440 is connected to an output end of the noise detector 420 and amplifies an electrical micro-signal input from the noise detector 420 into a predetermined magnitude.

Output ends of the first pre-amplifier 430 and the second pre-amplifier 440 are respectively connected to a non-inverting terminal (+) and an inverting terminal (−) of the differential amplifier 450. The differential amplifier 450 can effectively offset noise signals and can detect an alpha particle detection signal by amplifying the electrical signals pre-amplified through the first pre-amplifier 430 and the second pre-amplifier 440 in proportion to the voltage difference of the electrical signals.

That is, as differential amplification is performed by the differential amplifier 450, it is possible to effectively offset noises having the same phase and flowing inside through the probe unit 300 or 300' and the noise detector 420 and it is possible to accurately and quickly obtain a high-sensitivity and low-noise alpha particle detection signal.

Further, the electromagnetic wave-protective cap 500 is installed on the second side of the cover 200 to surround the entire measurement circuit 400 and is made of a conductive material to prevent signal disturbance of the measurement circuit 400 due to external electromagnetic wave noise.

It is preferable that the electromagnetic wave-protective cap 500 is installed to be electrically connected with the ground of the measurement circuit 400.

Meanwhile, though not shown in the figures, a control unit (e.g., an MCU) that calculates a concentration value of alpha particles (e.g., a radon concentration value) by counting alpha particle detection signals (e.g., pulse signals), which are output from the differential amplifier 450, for a predetermined measurement time (e.g., 10 minutes, 30 minutes, and 1 hour), etc. may be provided.

That is, the present disclosure can effectively provide a radon sensor device using a polyhedral ionization chamber that has excellent mountability and mass productivity and can exclude interference of thoron (Rn-220).

Although preferred embodiments of a radon sensor device using a polyhedral ionization chamber according to the present disclosure were described above, the present disclosure is not limited thereto and may be modified in various ways without departing from claims, the detailed description, and the accompanying drawings, and they are also included in the present disclosure.

INDUSTRIAL APPLICABILITY

The present disclosure can be widely used in radon sensor devices.

The invention claimed is:

1. A radon sensor device using a polyhedral-shaped ionization chamber, the radon sensor device comprising:
   an ionization chamber having an open side and inner sides surrounded by a first conductor and generating an electrical field therein by applying bias power to the first conductor;
   a cover having a first side covered with a second conductor and closing the open side of the ionization chamber such that that first conductor disposed on the inner sides of the ionization chamber and the second conductor are electrically connected;
   a probe unit disposed in the ionization chamber and absorbing ion charges produced when alpha (α) decay occurs in the ionization chamber; and
   a measurement circuit detecting an alpha particle detection signal by amplifying and processing an electrical micro-signal input from the probe unit into a predetermined magnitude,
   wherein the first conductor disposed on the inner sides of the ionization chamber and the second conductor disposed on the first side of the cover are electrically connected through joints between the cover and the ionization chamber.

2. The radon sensor device of claim 1, wherein the ionization chamber is formed in a hexahedral shape using an insulating material.

3. The radon sensor device of claim 1, wherein the first conductor disposed on the inner sides of the ionization chamber is formed by coating conductive paint with a predetermined thickness on the inner sides of the ionization chamber.

4. The radon sensor device of claim 1, wherein the bias power that is applied to the first conductor disposed on the inner sides of the ionization chamber is a DC voltage of 50 V to 300 V.

5. The radon sensor device of claim 1, wherein the cover is a printed circuit board (PCB) having a predetermined thickness and the entire of a first side of the printed circuit board is covered with the second conductor.

6. The radon sensor device of claim 1, wherein a plurality of holes is formed through the cover so that external air can flow into the ionization chamber or air can flow outside.

7. The radon sensor device of claim 6, wherein when a volume of the ionization chamber is 100cc, a diameter of the holes formed through the cover is 0.2 mm to 0.3 mm and the number thereof is 6 to 10.

8. The radon sensor device of claim 1, wherein the probe unit detects ion charges produced by a collision of air and alpha particles produced when alpha (α) decay occurs in the ionization chamber.

9. The radon sensor device of claim 1, wherein the probe unit is disposed at a center in the ionization chamber and is formed in a T-shape.

10. The radon sensor device of claim 9, wherein the probe unit is formed in a T-shape by perpendicularly combining first and second probes that have a rod shape or a straight shape having a predetermined length; and
   a first end of the first probe is electrically connected with the measurement circuit through the cover and a second end of the first probe is disposed at the center in the ionization chamber, and a center of the second probe is perpendicularly coupled to the second end of the first probe and is disposed at the center in the ionization chamber such that distances between the inner sides of the ionization chamber and a surrounding portion of the second probe are the same.

11. The radon sensor device of claim 1, wherein the probe unit is disposed at a center in the ionization chamber and is formed in an outdoor TV antenna shape.

12. The radon sensor device of claim 11, wherein the probe unit is formed by combining a first probe having a T-shape and second probes having a predetermined pattern,
wherein the first probe has an upper head formed in a rod shape or a straight shape with a predetermined length and disposed at the center in the ionization chamber, has a lower leg formed in a rod shape or a straight shape with a predetermined length and having a first end perpendicularly connected to a center of the upper head to form a T-shape and a second end electrically connected to the measurement circuit through the cover; and
the second probes are formed in a rod shape or a straight shape with a predetermined length, are coupled at centers to the upper head of the first probe, are longitudinally spaced a predetermined distance from each other, and are coupled perpendicular to or at a predetermined angle with respect to a longitudinal direction of the upper head of the first probe to have a predetermined pattern.

13. The radon sensor device of claim 11, wherein the probe unit is formed by combining a first probe having a T-shape and second probes having a predetermined pattern,
wherein the first probe has an upper head formed in a rod shape or a straight shape with a predetermined length and disposed at the center in the ionization chamber, has a lower leg formed in a rod shape or a straight shape with a predetermined length and having a first end perpendicularly connected to a center of the upper head to form a T-shape and a second end electrically connected to the measurement circuit through the cover; and
the second probes are combined to vertically and horizontally cross each other at a right angle in a lattice pattern and centers thereof are longitudinally coupled to the upper head of the first probe.

14. The radon sensor device of claim 13, wherein the second probes are coupled to the upper head of the first probe to vertically and horizontally cross each other at a right angle, whereby the lattice pattern thereof is a square lattice pattern or a skew-crossed pattern.

15. The radon sensor device of claim 1, wherein the probe unit is disposed in the ionization chamber such that distances between the inner sides of the ionization chamber and a surrounding portion of the second probe are the same.

16. The radon sensor device of claim 1, wherein the measurement circuit is disposed on a second side of the cover and is mounted to be electrically connected with the second conductor disposed on the first side of the cover through a bias voltage outputter for outputting the bias power.

17. The radon sensor device of claim 1, wherein the measurement circuit comprises:
a guard ring installed such that the probe unit is disposed therethrough and absorbing and sensing a leakage current generated between the ionization chamber and the probe unit to a ground;
a noise detector connected between the guard ring and the ground, sends a DC-type leakage current generated between the ionization chamber and the probe to the ground, and detects and outputs AC-type noise;
first and second pre-amplifiers respectively connected to another end of the probe and an output end of the noise detector, and amplifying small electrical signals input from the probe and the noise detector into a predetermined magnitude; and
a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

18. The radon sensor device of claim 17, wherein the noise detector is configured by electrically connecting at least any one element of a resistance, a condenser, and a diode in series, in parallel, or in combination of series and parallel.

19. The radon sensor device of claim 1, further comprising:
an electromagnetic wave-protective cap installed on a second side of the cover to surround the entire measurement circuit and is made of a conductive material to prevent signal disturbance of the measurement circuit due to external electromagnetic wave noise,
wherein the electromagnetic wave-protective cap is installed to be electrically connected with a ground of the measurement circuit.

* * * * *